United States Patent [19]

Kohler

[11] Patent Number: 4,757,597
[45] Date of Patent: Jul. 19, 1988

[54] METHOD OF ASSEMBLING A FRICTION CLUTCH

[75] Inventor: Helmut Kohler, Bühlertal, Fed. Rep. of Germany

[73] Assignee: Luk Lamellen und Kupplungsbau GmbH, Bühl, Fed. Rep. of Germany

[21] Appl. No.: 897,106

[22] Filed: Aug. 15, 1986

Related U.S. Application Data

[62] Division of Ser. No. 509,190, Jun. 29, 1983, Pat. No. 4,615,424.

[30] Foreign Application Priority Data

Jun. 30, 1982 [DE] Fed. Rep. of Germany ....... 3224404

[51] Int. Cl.$^4$ .............................................. B23P 11/02
[52] U.S. Cl. ..................................... 29/523; 29/525.1
[58] Field of Search .................. 411/39, 40, 41, 44, 411/45; 192/70.18, 109 R; 29/523, 526 R

[56] References Cited

U.S. PATENT DOCUMENTS 2,088,955  8/1937  Hamill .................................. 411/44
2,181,103  11/1939  Davis .................................... 411/44

Primary Examiner—Timothy V. Eley
Attorney, Agent, or Firm—Peter K. Kontler

[57] ABSTRACT

The axially movable pressure plate of a friction clutch for motor vehicles is non-rotatably secured to the housing by a set of leaf springs each of which has an end portion overlying that surface of the pressure plate which faces away from the clutch plate. The end portion of each leaf spring has an opening in register with the open end of a blind bore in the surface of the pressure plate. Such end portions of the leaf springs are permanently fastened to the pressure plate by tubular connecting elements having (a) enlarged end portions overlying those sides of the leaf springs which face away from the pressure plate and (b) main portions which extend through the respective openings and into the registering blind bores and are radially expanded into pronounced frictional engagement with the pressure plate. The plastically deformable material of the main portions of the connecting elements is expanded by an extractible tool or by discrete spreading pins which are driven into open-ended sockets of the connecting elements and remain therein to maintain the main portions in radially expanded condition. The connecting elements contribute to a reduction of the overall weight of the friction clutch, to a reduction of the dimensions of the clutch, as considered in the axial and radial directions, to a reduction of the weight of the clutch, and to greater reliability of the connections between the leaf springs and the pressure plate and hence to greater safety of the clutch.

8 Claims, 1 Drawing Sheet

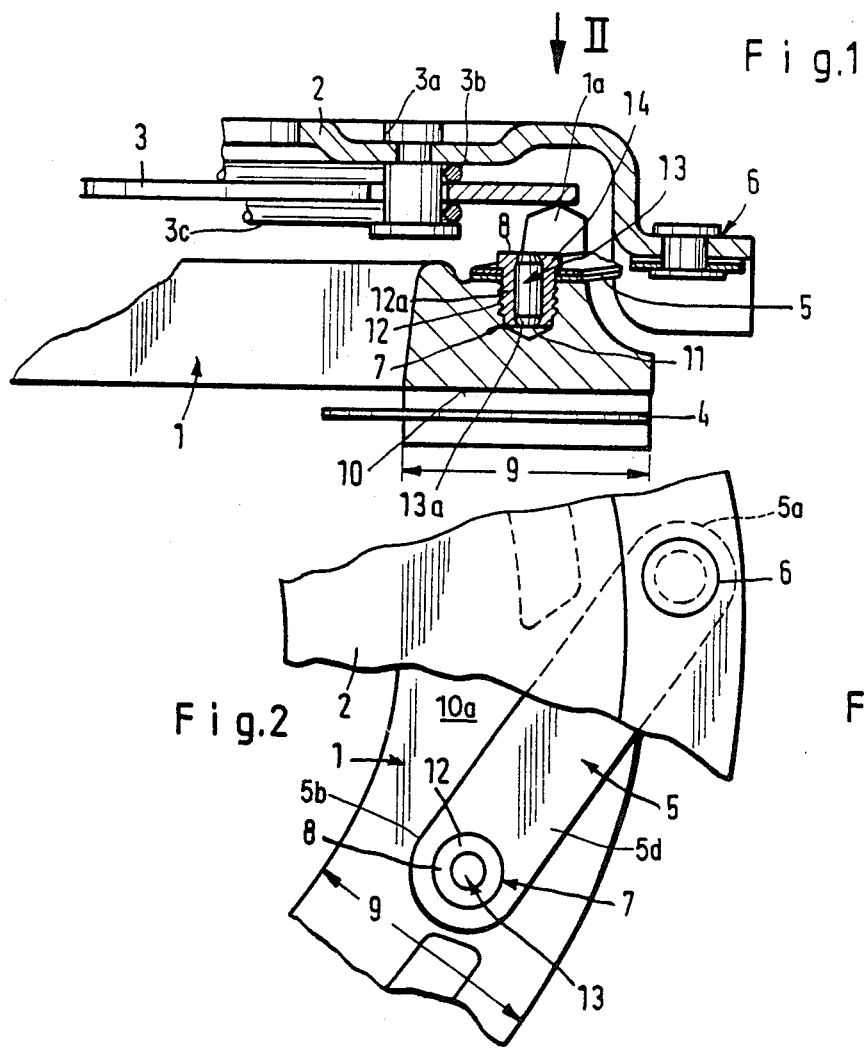

METHOD OF ASSEMBLING A FRICTION CLUTCH

This application is a division, of application Ser. No. 509,190, filed June 29, 1983, now U.S. Pat. No. 4,615,424.

CROSS-REFERENCE TO RELATED CASE

The friction clutch which is disclosed in the present application is similar to the friction clutch described in my commonly owned copending patent application Ser. No. 509,190 filed June 29, 1983 for "Fastening devices for friction clutches and method of assembling such fastening devices".

BACKGROUND OF THE INVENTION

The present invention relates to friction clutches in general, especially to friction clutches for use in motor vehicles, and more particularly to improvements in friction clutches of the type wherein certain components are non-rotatably but axially movably coupled to each other by leaf springs or other deformable coupling means.

It is well known to construct a friction clutch in such a way that a diaphragm spring or another suitable energy storing device urges a pressure plate against the friction lining of a clutch plate or disc and that the pressure plate is axially movably but non-rotatably secured to the clutch housing, e.g., to a cover of the housing, by several equidistant sets of leaf springs which are deformable in directions to allow for axial movements of the pressure plate under or against the bias of the diaphragm spring. Reference may be had, for example, to German Offenlegungsschrift No. 1,600,093 which discloses a friction clutch of the just outlined character. In the clutch of this German publication, the pressure plate is provided with equidistant projections (as considered in the circumferential direction of the clutch) which extend radially outwardly and each of which is connected with one end portion of a leaf spring by means of a rivet. The other end portions of the leaf springs are connected to the housing of the friction clutch. The orientation of the leaf springs is such that they allow the pressure plate to move axially of the housing but the pressure plate and the housing are held against angular movement with reference to one another. The shanks of the rivets extend through openings which are provided therefor in the respective end portions of the leaf springs. The shank of each rivet also extends through a hole in the respective projection of the pressure plate, and the rivets have heads adjacent to those sides of the projections which fact away from the respective leaf springs. The space requirements of the rivet heads at the exterior of the pressure plate contribute to the axial dimensions of the friction clutch. Moreover, the projections (which are provided for the express purpose of supporting the respective end portions of the leaf springs) contribute to the dimensions of the friction clutch, as considered in the radial direction of the clutch housing. This creates problems in many types of compact vehicles where the space is at a premium and, moreover, the projections of the pressure plate contribute to the weight of the clutch. Still further, centrifugal force acting upon the projections renders it necessary to increase the weight, mass and bulk of the circular main portion of the pressure plate so that such main portion can stand the developing stresses even if the pressure plate is rotated at a very high speed. The standards regarding the bursting strength of pressure plates in friction clutches are very high and must be met by the component parts of friction clutches which are intended for use in motor vehicles and the like.

Another mode of securing the end portions of leaf springs to an axially movable pressure plate in a friction clutch is disclosed in U.S. Pat. No. 3,283,864 granted Nov. 8, 1966 to Motsch. The fastening means comprises rivets extending through those portions of the pressure plate which bear against the clutch disc when the clutch is to transmit torque. To this end, the pressure plate is formed with an annulus of through holes in the region of its friction generating surface, and each hole has an enlarged portion at that end which terminates in the friction surface. The shank of each rivet extends through the opening of the respective leaf spring and through the smaller-diameter portion of the respective through hole in the pressure plate, and each rivet has a head in the larger-diameter portion of the respective hole. A drawback of such proposal is that the making of holes in the annular portion of the pressure plate reduces the area of the friction surface (namely, of the surface which engages the adjacent lining of the clutch disc when the clutch is engaged), especially since the larger-diameter ends of such holes terminate at the friction surface. This means that the remaining portion of the friction surface is subjected to more pronounced wear, especially in the regions between the neighboring holes, and the friction surface is likely to develop pronounced channels or furrows after a relatively short period of use. The development of furrows in the friction surface adversely influences the torque transmitting action because it affects the frictional engagement between such surface and the adjacent lining of the clutch disc. Still further, weakening of the pressure plate due to the provision of through holes in the friction surface entails localized accumulations of heat with attendant development of internal stresses and distortion of the pressure plate. The distortion can be so pronounced that it prevents disengagement of the pressure plate from the clutch disc and/or delays such disengagement and/or allows for mere partial disengagement of such parts from one another. Moreover, localized accumulations of heat in the regions of through holes are likely to entail the development of cracks which, in turn, can cause the pressure plate to burst within the higher RPM range.

A further mode of fastening leaf springs to the pressure plate of a friction clutch is disclosed in German Utility Model No. 1,925,053. The fastening means includes hollow screws which extend into tapped bores of the pressure plate. A drawback of such proposal is that vibrations, which are bound to develop when the friction clutch is in use in a motor vehicle or the like, cause the screws to become loose and to thus put not only the clutch but also the entire vehicle out of commission. Loosening of screws in the pressure plate is believed to be attributable to the absence of accurate mesh between the external threads of the screws and the internal threads of the pressure plate, i.e., to the absence of reliable and uniform transmission of forces between the pressure plate and the springs. This results in overstressing and excessive wear upon certain portions of the windings of the threads with attendant loosening of the screws and a breakdown of the connections between the leaf springs and the pressure plate. A further drawback of the just described fastening means is that the dimensions of openings in the leaf springs must be selected with utmost accuracy in order to prevent wobbling of the leaf springs with reference to the shanks of the screws. Any wobbling of the leaf springs would even further increase the likelihood of rapid loosening of the screws and would also result in pronounced wear upon the material of the leaf springs around the respective openings. This would entail immediate or rapid separation of leaf springs from the pressure plate.

OBJECTS AND SUMMARY OF THE INVENTION

An object of the invention is to provide a novel and improved connection between certain components of a friction clutch, especially between the housing and the axially movable pressure plate of a friction clutch for use in motor vehicles.

Another object of the invention is to provide novel and improved means for fastening the end portions of leaf springs or analogous deformable coupling members to the pressure plate of a friction clutch in such a way that the connections are more reliable, longer lasting, simpler and less expensive than the aforediscussed and other conventional connections.

A further object of the invention is to provide fastening means of the above outlined character which contribute little, if anything, to the weight and bulk of the clutch, not only in the radial but also in the axial direction, and which can stand vibrations and other stray movements of component parts of the clutch more readily than heretofore known fastening means.

An additional object of the invention is to provide fastening means which can be assembled and applied with little loss in time and by resort to relatively simple tools.

Still another object of the invention is to provide a novel and improved method of establishing reliable connections between certain constituents of friction clutches for use in motor vehicles or the like.

An additional object of the invention is to provide a method which can be practiced with resort to simple machinery and tools, and which ensures the establishment of longer-lasting and more reliable connections than in accordance with heretofore known proposals.

A further object of the invention is to provide a friction clutch which embodies one or more fastening means of the above outlined character.

Another object of the invention is to provide a motor vehicle embodying a clutch which features one or more fastening means of the aforedescribed character.

One feature of the invention resides in the provision of a method of fastening a leaf spring to a pressure plate in a friction clutch, particularly in a friction clutch for motor vehicles. The method comprises the steps of providing a surface of the pressure plate with a blind bore (such surface preferably faces away from the clutch plate against which the pressure plate is movable in order to engage the clutch), providing one end portion of the leaf spring with an opening and placing the opening into register with the open end of the blind bore so that one side of the leaf spring faces away from the aforementioned surface of the pressure plate, introducing into the opening and into the registering blind bore a plastically deformable tube which has an enlarged end portion overlying the aforementioned side of the spring, and expanding at least a part of the tube in the blind bore radially so as to move the expanded part of the tube into pronounced frictional engagement with the pressure plate.

The expanding step can comprise driving into the tube a tool whose cross-sectional area exceeds, at least in part, the inner diameter of the tube. The tool can be left in the interior of the expanded tube, or it can be extracted upon completion of the expanding step.

The method can further comprise the step of expanding an end portion of the tube in the region which is outwardly adjacent to the aforementioned side of the leaf spring so that the thus expanded end portion of the tube constitutes the aforementioned enlarged end portion.

Another feature of the invention resides in the provision of a friction clutch, particularly for motor vehicles, comprising first and second rotary components which are coaxial with one another and at least the first of which is movable axially relative to the second component, and a coupling member including a first portion which is secured to one of the two components and a second portion which overlies the other component and has an opening (e.g., a non-circular opening). That surface of the other component which is adjacent to the second portion of the coupling member has a blind bore in register with the opening of the second portion, and the clutch further comprises means for fastening the second portion of the coupling member to the other component. Such fastening means includes a connecting element which extends through the opening and has an at least partially expanded first portion received in the blind bore and being in pronounced frictional engagement with the other component. The connecting element further includes an end portion overlying (in the region of the opening) that side of the second portion of the coupling member which faces away from the other component and serving to hold the second portion of the coupling member against movement away from the adjacent surface of the other component.

The first component can constitute a pressure plate, and the second component can constitute or form part of the clutch housing. The coupling member can comprise a single leaf spring or a package of overlapping leaf springs, and the first portion of the connecting element can constitute a tube. Such clutch further comprises a clutch plate adjacent to that (second) surface of the pressure plate which faces away from the second portion of the leaf spring or springs, and a clutch spring (e.g., a diaphragm spring) which reacts against the housing and bears against the pressure plate so as to urge the latter against the clutch plate. The pressure plate can constitute an annulus and its second surface bears against a friction lining of the clutch plate when the clutch spring is free to maintain the pressure plate in frictional engagement with the lining of the clutch plate.

The pressure plate can be provided with a profiled internal surface which surrounds at least a portion of the blind bore, and the external surface of the first portion of the connecting element is preferably held in intimate contact with the internal surface of the pressure plate. The first portion of the connecting element consists, at least in part, of a plastically deformable (ductile) material (preferably a suitable metal), and the just mentioned external surface is then provided on such plastically deformable material. The internal surface of the pressure plate can be threaded. If the external surface of the first portion of the connecting element is profiled (in addition to or in lieu of the internal surface of the pressure plate), the profile of such external surface can be formed by one or more threads.

The connecting element can be provided with a socket which is open in the region of the end portion of the connecting element, and the fastening means can further comprise a spreading element which is driven into the socket to maintain the first portion of the connecting element in expanded condition. Such first portion can be integral with the end portion of the connecting element. The socket can comprise a first portion of greater diameter and a second portion of smaller diameter, and at least the major part of the spreading element can be received in the first portion of the socket. The spreading element can comprise a substantially conical (e.g., frustoconical) end portion which is disposed in the blind bore and is remote from that surface of the pressure plate which is adjacent to the second portion of the leaf spring, i.e., the conical portion can be disposed in or close to the deepmost portion of the socket. The apex angle of the conical or frustoconical portion of the spreading element is preferably between about 30 and 60 degrees, most preferably about 40 degrees. Alternatively, the spreading element can comprise a substantially spherical (preferably hemispherical) end portion which is disposed in or close to the deepmost portion of the socket. The spreading element effects radial expansion of at least a part of the plastically deformable first portion of the connecting element to thus ensure that such first portion is in requisite frictional engagement with the internal surface of the pressure plate. The end portion of the connecting element can constitute or resemble an annulus which surrounds the opening of the second portion of the leaf spring at that side of the leaf spring which faces away from the pressure plate. The spreading element can completely fill the socket of the connecting element, and its outer end face can be flush with the exposed end face of the annular or otherwise configurated end portion of the connecting element. As a rule, the end portion of the connecting element will or can constitute a deformed part of the first portion. The extent or nature of radial expansion or deformation of the first portion of the connecting element can be such that this first portion completely fills the opening of the leaf spring.

If desired, the socket of the connecting element can remain empty. For example, the socket can be formed by a suitable spreading tool which is thereupon extracted from the socket so that the deformed or expanded connecting element resembles a sleeve one end of which is but need not be closed and the other end of which has a radially outwardly extending collar constituting the aforementioned end portion of the connecting element.

If a spreading element (e.g., a pin) is used to fill the socket of the connecting element, that (outer) end portion of the spreading element which is surrounded by the end portion of the connecting element is preferably closely surrounded by the material of the end portion of the connecting element so as to prevent axial shifting of the spreading element. The cross-sectional area of that (major) portion of the spreading element which is received in the inner part of the socket (i.e., which is surrounded by the first portion of the connecting element in the blind bore of the pressure plate) preferably exceeds the cross-sectional area of the outer end portion. The latter can constitute or resemble a portion of a sphere or a portion of a cone whose cross-sectional area decreases in a direction away from the blind bore.

The novel features which are considered as characteristic of the invention are set forth in particular in the appended claims. The improved fastening means itself, however, both as to its construction and the mode of assembling the same, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary axial sectional view of a friction clutch wherein an end portion of a package of overlapping leaf springs is fastened to an axially movable pressure plate of the clutch in accordance with a first embodiment of the invention;

FIG. 2 is a fragmentary plan view of the friction clutch, as seen in the direction of arrow II in FIG. 1;

FIG. 3 illustrates a detail in the structure of FIG. 1 and shows the initial stage of driving a spreading element into the socket of a connecting element forming part of the improved fastening means;

FIG. 4 is an elevational view of a modified spreading element having a substantially hemispherical end portion; and FIG. 5 is a view similar to that of FIG. 3 but showing a modified fastening means whose tubular connecting element is radially expandible by a retractible tool.

DESCRIPTION OF THE PREFERRED EMBODIMENTS

Referring first to FIGS. 1 and 2, there is shown a portion of a friction clutch which comprises an axially movable pressure plate 1, a housing 2 including a cover which overlies the pressure plate 1, a diaphragm spring 3 which reacts against and is secured to the housing 2 by an annulus of rivets 3a so that it can flex in the region of two coaxial ring-shaped seats 3b, 3c and can bear against axially extending protuberances 1a of the pressure plate 1, and a clutch disc or clutch plate 4 which is in contact with the adjacent friction surface 10 of the pressure plate when the latter is free to follow the bias of the diaphragm spring 3. The rivets 3a further serve to hold the seats 3b, 3c against axial and/or radial movement with reference to the diaphragm spring 3 and housing 2. The clutch is engaged when the friction surface 10 of the pressure plate 1 is free to bear, with requisite force, against the adjacent surface of the clutch disc 4 which is thereby compelled to bear against a torque transmitting element, e.g., a flywheel (not shown) receiving rotary motion from the crankshaft of an internal combustion engine.

The means for coupling the pressure plate 1 to the housing 2 in such a way that the pressure plate is held against rotation but is movable axially of the housing (into and from frictional engagement with the clutch disc 4) comprises a set of equidistant leaf springs 5 each having a first end portion 5a secured to the housing 2 by a rivet 6 and a second end portion 5b secured to the pressure plate 1 by a fastening device 7 which is constructed, mounted and assembled in accordance with an embodiment of the present invention.

The fastening device 7, which is shown in FIGS. 1, 2 and 3 of the drawing, comprises a tubular connecting element 12 and a spreading or expanding element 13. The tubular first portions 12a of the connecting elements 12 extend through the openings 5c which are provided in the second portions 5b of the respective leaf springs 5 and into registering blind bores 11 which are machined into or otherwise formed in that surface (10a) of the pressure plate 1 which faces away from the clutch disc 4. The blind bores 11 are not formed in radially outwardly extending projections of the pressure plate 1 but rather in that (annular) portion of the pressure plate which is provided with the friction surface 10 serving to engage the clutch disc 4 when the clutch is engaged. The width of the surface 10 is indicated at 9; the blind bores 11 can be disposed substantially or exactly midway between the outer and inner annular surfaces of the pressure plate 1.

Each leaf spring 5 can be assembled of two or more discrete leaf springs which accurately overlap each other and have registering openings 5c for parts of the respective first portions 12a of the connecting elements 12. That surface or side of the illustrated leaf spring 5 which faces away from the surface 10a of the pressure plate 1 is denoted by the character 5d.

Each fully inserted connecting element 12 resembles a rivet blank with an end portion or head 14 at one of its axial ends, and such head or end portion of the connecting element overlies the surface 5d in the region of the respective opening 5c to prevent the end portion 5b from moving away from the surface 10a of the pressure plate 1 when the connecting element 12 is properly anchored in the respective blind bore 11. The first portion 12a of the connecting element 12 has a socket 17 which can constitute a through bore or a bore which is closed at the end remote from the annular end portion or collar 14. The spreading element 13 is fully received in the socket 17 so that its outer end face is flush with the outer end face 8 of the end portion 14 when the fastening device 7 which is shown in FIGS. 1, 2 and 3 is fully installed. The element 13 prevents any stray movements of the end portion 5b with reference to the pressure plate 1.

The end portion 14 of the illustrated connecting element 12 is integral with the first portion 12a; however, it is also possible to make the end portion 14 integral with the spreading element 13 so that the end portion 5b of the leaf spring 5 is held against movement away from the surface 10a of the pressure plate 1 when the spreading element 13 is driven home to thereby effect requisite radial expansion of the plastically deformable (ductile) material of the first portion 12a of the connecting element 12. Radial expansion of the portion 12a is preferably carried out in such a way that the portion 12a also completely fills the opening 5c in the end portion 5b of the leaf spring 5. The outline of the opening 5c preferably deviates from a circular outline, i.e., such opening can have an oval or polygonal outline and is filled with the material of the portion 12a when the installation of the fastening device 7 is completed. The material of the connecting element 12 can be any metal or alloy which is capable of undergoing requisite radial expansion in response to penetration of the much less deformable spreading element 13 into the axial socket 17 to thus ensure that the radially expand part of the portion 12a is held in pronounced frictional engagement with the internal surface bounding the blind bore 11 of the pressure plate 1 and preferably also that the radially expanded part of the portion 12a completely fills the opening 5c of the respective end portion 5b of the leaf spring 5.

As can be seen in FIG. 3, the internal surface of the pressure plate 1 in the blind bore 11 is provided with threads 16 which extend along a portion (15) of the axial length or depth of the blind bore. The threads 16 can be replaced with another suitable uneven profile which ensures a more reliable retention of the portion 12a in the bore 11 in response to radial expansion of the portion 12a, i.e., in response to penetration of the spreading element 13 into the socket 17. The thread 16 is preferably immediately adjacent to the surface 10a and may but need not extend all the way to the deepmost portion 11a of the blind bore 11.

It is clear that a similar or analogous result can be achieved if the thread 16 is provided on the external surface of the portion 12a of the connecting element 12 and the internal surface of the pressure plate 1 (in the blind bore 11) is merely provided with a profile which approximates or resembles the profile of the externally threaded region of the portion 12a. Still further, it is possible to provide internal threads 16 in the blind bore 11 of the pressure plate 1, to provide similar or somewhat similar external threads on the external surface of the portion 12a, and to deform the external threads of the portion 12a into exact mesh with the internal threads 16 of the pressure plate 1 when the portion 12a undergoes radial expansion in response to introduction of the spreading element 13 into the socket 17. All that counts is to ensure that the frictional engagement between the external surface of the portion 12a and the surface bounding the blind bore 11 will suffice to reliably prevent uncontrolled extraction of the connecting element 12 from the bore 11 and opening 5c.

Prior to penetration of the spreading element 13 into the interior of the connecting element 12, the socket 17 preferably includes a smaller-diameter inner portion 17b and a larger-diameter outer portion 17a. The preferably frustoconical front end portion or leading end 13a of the spreading element 13 is introduced into the larger-diameter portion 17a and the element 13 is thereupon forcibly introduced into the smaller-diameter portion 17b of the socket 17 to thus expand the portion 12a of the connecting element 12 in the aforedescribed manner. The apex angle of the conical portion 13a is preferably between 30 and 60 degrees, most preferably approximately 40 degrees. This has been found to facilitate penetration of the spreading element 13 into the portion 12a of the connecting element 12. As further shown in FIG. 3, the trailing or upper portion 13b of the spreading element 13 is preferably a mirror image of the leading portion 13a so that one need not be careful in selecting that end portion of the element 13 which is to be introduced into the larger-diameter portion 17a of the socket 17 preparatory to spreading of the portion 12a into intimate contact with the surface surrounding the blind bore 11. Another advantage of the frustoconical rear end portion 13b of the spreading element 13 is that it can be completely and closely surrounded by the material of the end portion 14 (note FIG. 1) when the spreading element 13 is driven home so that its upper end face (as viewed in FIG. 3) lies flush with the exposed side or surface 8 of the end portion 14 of the connecting element 12. This ensures that the spreading element 13 is not likely to migrate axially of the connecting element 12 and to possibly weaken the connection between the portion 12a and the surrounding material of the pressure plate 1.

The device which is used to drive the spreading element 13 into the socket 17 of the connecting element 12 is not specifically shown in the drawing. Such device causes the element 13 to enter the smaller-diameter portion 17b of the socket 17 and to expand the portion 12a so that it fills the thread 16 in the internal surface of the pressure plate 1 with attendant permanent anchoring of the connecting element 12 in the blind bore 11. Also, the device which drives the spreading element 13 home can be used to ensure that the exposed end face of the fully introduced (i.e., fully confined) spreading element 13 is flush with the exposed end face 8 of the end portion 14 as well as that the end portion 14 adequately surrounds the trailing end portion 13b of the fully inserted spreading element.

FIG. 4 shows a slightly modified spreading or expanding element 18 having a substantially spherical (preferably hemispherical) leading end portion 18a corresponding to the frustoconical end portion 13a of the spreading element 13. The rear end portion 18b of the spreading element 18 can resemble the front end portion 18a and can serve the same purpose as the rear end portion 13b of the spreading element 13, i.e., it can be closely surrounded by the material of the end portion 14 when the spreading element 18 is driven home in lieu of the spreading element 13.

It is further clear that other types of spreading elements can be used with similar or equal advantage. For example, the central portion of the spreading element 13 or 18 need not constitute a cylindrical pin or post, i.e., such central portion can have a polygonal outline without departing from the spirit of the invention. Also, one end portion of the spreading element can have a conical (preferably frustoconical) outline and the other end portion of the same spreading element can have another (e.g., spherical and preferably semispherical) outline. Furthermore, the cross-sectional area of the central portion of the spreading element need not be constant all the way between the end portions 13a, 13b or 18a, 18b; for example, the cross-sectional area of the central portion can increase in a direction from the leading portion 13a or 18a toward the rear end portion 13b or 18b, especially if the rear end portion is closely surrounded by the material of the end portion 14 so that the fully embedded spreading element is prevented from leaving the socket 17 of the connecting element 12.

An important advantage of the improved fastening device is that the connection between each leaf spring and the pressure plate 1 is not only highly reliable but also compact and extremely unlikely to permit stray movements of the end portions 5b of leaf springs 5 and/or complete detachment of such leaf springs from the pressure plate. It has been found that radial expansion of the first portion 12a of the connecting element 12 invariably ensures the establishment of a frictional and/or form-locking engagement with the pressure plate which can guarantee reliable and permanent connection between the leaf spring and the pressure plate under all foreseeable circumstances of use of the friction clutch.

Another important advantage of the improved fastening device is that it ensures uniform distribution of forces along the entire or nearly entire internal surface surrounding the blind bore 11 and along the entire or nearly entire external surface of the portion 12a of the connecting element 12 so that certain portions of the connecting element are highly unlikely to be subjected to pronounced or excessive localized stresses. Also, any appreciable play between the end portion 5b of the leaf spring 5 and the adjacent portion of the pressure plate 1 is practically impossible. This contributes to longer useful life of the fastening device and to more predictable operation of the friction clutch.

While it often suffices if the blind bore 11 is simply surrounded by a more or less cylindrical internal surface of the pressure plate 1, the provision of aforediscussed unevennesses in the form of threads 16 or the like (at least along a certain portion (15) of the internal surface of the pressure plate) can contribute significantly to greater reliability and safety of the fastening device. As mentioned above, the threads 16 or other types of unevennesses need not extend along the full axial length of the blind bore 11 but can be provided only in a selected portion or in certain isolated (spaced apart) portions of such internal surface. The provision of unevennesses at the internal surface of the blind bore 11 (and hence at the external surface of the radially expanded plastically deformed portion 12a) not only increases the safety of the fastening device but also increase the area of surface-to-surface contact between the portion 12a and the pressure plate 1 with attendant reduction of stresses per unit area of such surfaces and an even more pronounced reduction of the likelihood of damage to the fastening device in response to the application of pronounced stresses tending to extract the portion 12a from the blind bore 11.

The permanently installed spreading element 13 or 18 also contributes to reliability, longer useful life and safety of the improved fastening device. As mentioned above, the spreading element 13 or 18 is introduced first into the larger-diameter portion 17a of the respective socket 17 and is thereupon forced into the smaller-diameter portion 17b with attendant radial expansion of the portion 12a and resulting reliable engagement between the external surface of the portion 12a and the internal surface of the adjacent portion of the pressure plate 1. The provision of the aforediscussed tapering leading end portion 13a or 18a facilitates introduction of the respective spreading element 13 or 18 into the socket 17 of the selected connecting element 12 and further ensures predictable and gradual radial expansion of the portion 12a into requisite frictional and/or form-locking engagement with the pressure plate 1.

If the annular end portion 14 of the connecting element 12 is already present before the portion 12a is introduced into the blind bore 11, the end portion 14 can serve as a means for determining the extent of penetration of the portion 12a into the bore of the pressure plate 1. However, it is equally within the purview of the invention to form the enlarged end portion 14 subsequent to introduction of the portion 12a into the blind bore 11, e.g., by resorting to a tool which drives the spreading element 13 or 18 into the socket 17 and, when the introduction of the spreading element is completed, converts the outer end of the portion 12a into a collar 14 which resembles the head of a rivet, which holds the end portion 5b of the respective leaf spring 5 against movement away from the surface 10a of the pressure plate 1, and which preferably surrounds the rear end portion 13b or 18b of the fully introduced spreading element 13 or 18 to thus prevent axial movement of the spreading element out of the socket 17. Conversion of the outer end portion of the connecting element 12 into a ring 14 or the like can result in some radial expansion of the adjacent part of the tubular portion 12a so that the latter completely fills the opening 5c in the end portion 5b of the leaf spring 5. This ensures predictable and optimum transmission of forces between the leaf spring 5 and the fastening device. It is clear that the opening 5c can be filled with the material of the tubular portion 12a during introduction of the spreading element 13 or 18, i.e., additional tendency to expand the portion 12a within the confines of the opening 5c during the formation of the end portion 14 then merely constitutes a safety measure to invariably ensure that such opening is filled with the plastically deformable material of the connecting element 12 when the making of the fastening device is completed.

The provision of openings 5c whose outline deviates from a circular outline is often desirable and advantageous because this greatly reduces the likelihood of turning of the end portions 5b about the tubular portions 12a of the respective connecting elements 12 in the fully assembled fastening devices. When a non-circular opening 5c is filled with the plastically deformable material of the portion 12a, the respective end portion 5b is reliably held against any stray movements relative to the pressure plate 1 and/or the respective fastening device.

FIG. 5 illustrates a modified fastening device 7' which includes a single part, namely, a connecting element 21 having an axially extending socket 20 in its elongated first portion 21a and a collar-like end portion 14 which overlies the upper side 5d of the leaf spring 5. The surface bounding the blind bore 11 is formed with internal threads 16 and/or such threads are provided on the external surface of the portion 21a. The fastening element 7' does not comprise a permanently installed spreading element; the means for expanding the portion 21a is a spreading tool 19a provided at the lower end of a handle 19 and tapering in a direction away from the handle. The tip 19b of the tool 19a can constitute or resemble the frustum of a cone. When the radial expansion of the plastically deformable material of the element 21 in the bore 11 and in the opening of the leaf spring 5 is completed, the tool 19a is extracted so that the socket 20 remains open. The shoulder 19c of the handle 19 can serve as a means for flattening or smoothing the exposed side of the end portion 14 and for ensuring that this end portion lies against the side 5d of the leaf spring 5. The shoulder 19c can be said to constitute a means which converts the end portion 14 into a structure resembling the head of a rivet and which thereby ensures that the leaf spring 5 invariably contacts the adjacent surface of the pressure plate 1 when the installation of the fastening device 7' in the blind bore 11 and in the opening of the leaf spring is completed. As explained above, such conversion of the end portion 14 into a structure resembling the head of a rivet can take place simultaneously with radial expansion of the portion 21a into frictional and/or form-locking engagement with the material of the pressure plate 1 or simultaneously with permanent introduction of the spreading element 13 or 18 into the socket 17 of a connecting element 12. However, it is also within the purview of the invention to introduce the spreading element 13 or 18 or to introduce and then extract the tool 19a in a first step, and to thereupon treat the end portion 14 of the connecting element 12 or 21 in a separate second step. Such deformation of the end portion 14 invariably ensures that the opening of the leaf spring is filled with the material of the connecting element 12 or 21 if the opening is not filled during introduction of the spreading element 13 or 18 or during introduction of the extractible spreading tool 19a.

Without further analysis, the foregoing will so fully reveal the gist of the present invention that others can, by applying current knowledge, readily adapt it for various applications without omitting features that, from the standpoint or prior art, fairly constitute essential characteristics of the generic and specific aspects of my contribution to the art and, therefore, such adaptations should and are intended to be comprehended within the meaning and range of equivalence of the appended claims.

I claim:

1. A method of establishing a torque transmitting connection between substantially coaxial rotary first and second components in a friction clutch wherein one of the components is movable axially of the other of the components and the transmission of torque takes place by way of at least one coupling member, comprising the steps of affixing a first portion of the coupling member to the first component; providing a surface of the second component with a blind bore; forming a second portion of the coupling member with an opening and placing the second portion into a position of overlap with the surface of the second component so that the opening registers with the blind bore while a side of the second portion of the coupling member faces away from the surface of the second component; and fastening the second portion of the coupling member to the second component by means of a metallic connecting element, including passing the connecting element through the opening so that a first portion of the connecting element is received in the blind bore and an end portion of the connecting element extends beyond the side of the coupling member, at least partially expanding the first portion of the connecting element radially of the blind bore so that the first portion of the connecting element is anchored in the second component, and causing the end portion of the connecting element to overlie the side of the second portion of the coupling member in the region of the opening to thereby hold the second portion of the coupling member against movement away from the surface of the second component.

2. The method of claim 1, wherein the one component is the pressure plate and the other component is the housing of the friction clutch, the coupling member comprising at least one leaf spring and further comprising the steps of imparting to the first portion of the connecting element a tubular shape and providing the connecting element with a socket which is open in the region of the end portion of the connecting element, said expanding step including driving into the socket a spreading element so as to maintain the first portion of the connecting element in expanded condition.

3. The method of claim 2, wherein the first portion of the connecting element is integral with the end portion, said step of providing the connecting element with a socket including forming the socket with a smaller-diameter portion for the spreading element and with a larger-diameter portion.

4. The method of claim 2, wherein the first portion of the connecting element consists at least in part of a plastically deformable material which surrounds the spreading element in the socket, said driving step including expanding the socket so as to urge the plastically deformable material against and to cause such deformable material to conform to the surface surrounding the corresponding portion of the blind bore.

5. The method of claim 1, wherein the one component is the pressure plate and the other component is the housing of the friction clutch, the coupling member comprising at least one leaf spring and further comprising the steps of imparting to the first portion of the connecting element a tubular shape and providing the connecting element with a socket which is open in the region of the end portion of the connecting element, said expanding step including introducing into the socket a spreading element so that an outer end portion of the spreading element is disposed at the open end of the socket and is closely surrounded by the end portion of the connecting element and that a second portion of the spreading element with a cross-sectional area greater than that of the outer end portion is received in the socket witin the confines of the opening and the blind bore.

6. A method of establishing a torque transmitting connection between substantially coaxial first and second rotary components of a friction clutch wherein the first component includes a pressure plate which is movable axially of the second component and is biased axially, comprising the steps of securing a first portion of each of a plurality of leaf springs to the second component so that a second portion of each leaf spring overlies the pressure plate and a side of each second portion faces away from the pressure plate; providing the second portion of each leaf spring with an opening; and fastening each second portion to the pressure plate by a discrete connecting element, including anchoring a tubular portion of each connecting element in the pressure plate so that each tubular portion extends through the opening in the second portion of the respective leaf spring, causing an end portion of each connecting element to overlie the side of the second portion of the respective leaf spring, and providing each connecting element with a socket extending inwardly from the respective end portion.

7. The method of claim 6, wherein the second portions of the leaf springs overlie an external surface of the pressure plate and further comprising the step of providing the external surface of the pressure plate with blind bores each in register with the opening in the second portion of a leaf spring and each bounded by a profiled internal surface of the pressure plate, said anchoring step including anchoring the tubular portions of the connecting elements in the respective blind bores.

8. The method of claim 6, further comprising the steps of making the first portions of the connecting elements at least in part of a plastically deformable metallic material so that the first portions of the connecting elements can be readily expanded in the course of said anchoring step to be pressed against and to conform to the surfaces surrounding the corresponding portions of the respective blind bores.

* * * * *